CONTROLS FOR A GLASS CROSSPOINT ARRANGEMENT

Filed July 6, 1966 3 Sheets-Sheet 1

CONTROLS FOR A GLASS CROSSPOINT ARRANGEMENT

Filed July 6, 1966 3 Sheets-Sheet 2

United States Patent Office 3,483,516

Patented Dec. 9, 1969

3,483,516

CONTROLS FOR A GLASS CROSSPOINT ARRANGEMENT

Wolfgang Arndt, Ludwigsburg, Germany, assignor to International Standard Electric Corporation, New York, N.Y., a corporation of Delaware Filed July 6, 1966, Ser. No. 563,176

Claims priority, application Germany, July 21, 1965, St 24,163

Int. Cl. H04q *1/00, 1/18;* H04m *3/00*

U.S. Cl. 340—166 11 Claims

ABSTRACT OF THE DISCLOSURE

A guidewire switching network comprises a single wire control circuit using marginal currents for marking, higher currents for operating, and reverse polarity for holding.

The invention relates to controls for a glass reed crosspoint arrangement in which only one connecting path is possible between any particular input and an output.

Known systems perform a conjugated selection in crosspoint arrangements of exchange systems, particularly of telephone exchange systems. These systems use a route searching network, superimposed on the crosspoint arrangement. This route searching network consists of wires which extend in parallel with the speech wires. Beside the wires of the route searching network, known systems require further wires and lines to through-connect and hold connecting paths.

An object of the invention is to reduce the number of the auxiliary wires necessary to carry out a conjugated selection in a crosspoint arrangement, or an associated area, in which a particular input has access to a particular output only over one connecting path.

According to the invention, the problem is solved by means of single-wire control leads passing through the crosspoint arrangement in parallel to the speech wires. Marginal current circuits are formed to find all crosspoint elements reachable from a particular input and usable to connect a route leading to a particular one of the outputs. An activating circuit is formed via the crosspoint elements belonging to this route, and a holding circuit is formed via the crosspoint elements to hold the selected through-connected route.

The above mentioned and other features and objects of this invention and the manner of obtaining them will become more apparent, and the invention itself will be best understood by reference to the following description of an embodiment of the invention taken in conjunction with the accompanying drawings, in which.

Figures 1, 2:
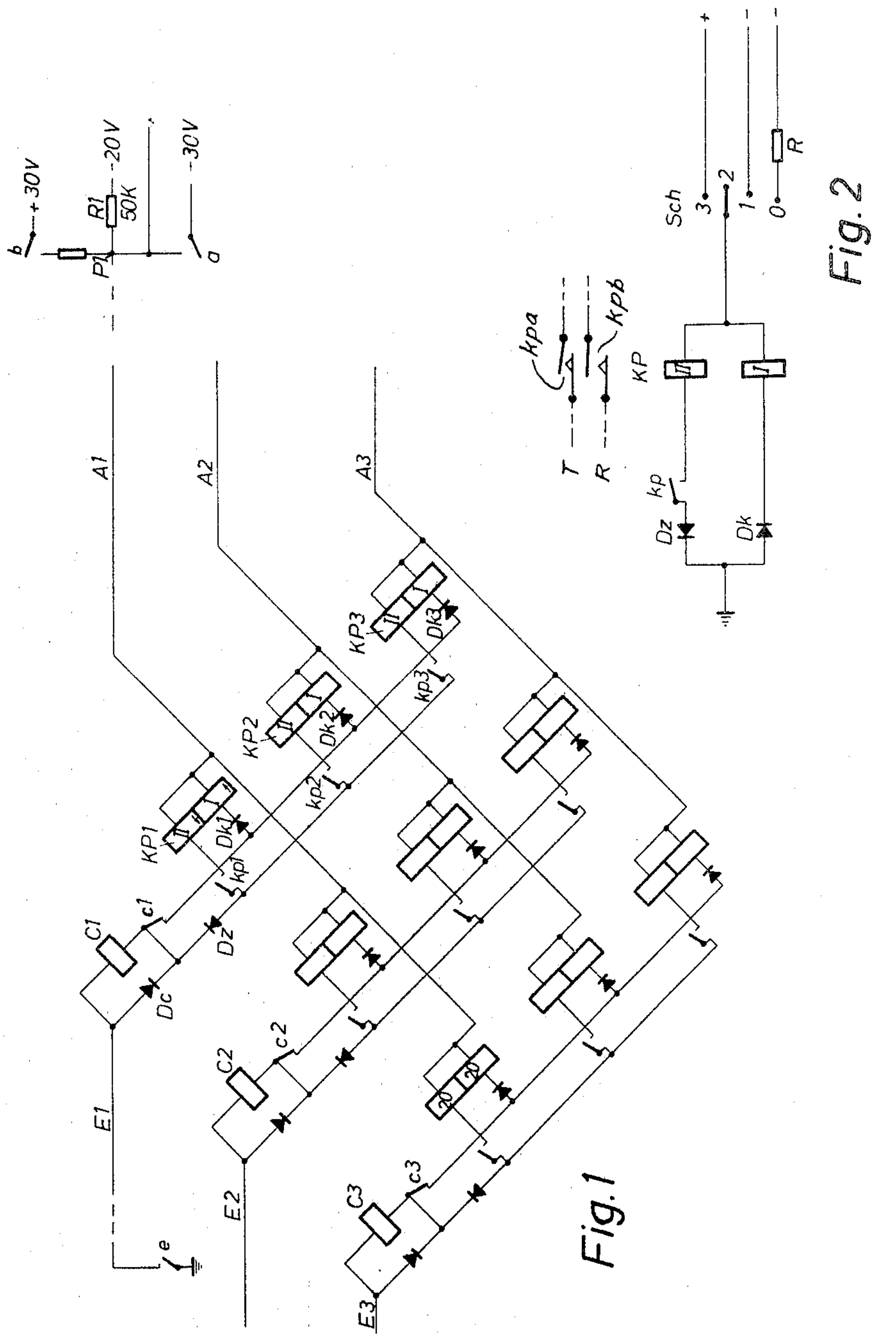
FIG. 1 shows a circuit arrangement for a switching multiple used to carry out the invention.
FIG. 2 shows a simplified representation of the various circuits, passing through the windings of a crosspoint element.

FIG. 1 shows only the control leads of a crosspoint or switching multiple. These leads are extended in parallel with the speech wires. These speech wires T and R are completed by two extra contacts on each pertinent crosspoint, as shown at K*pa*, and *Kpb*, for example. It should be understood that each of the crosspoints will carry such speech contacts and complete a parallel speech path in a similar manner. The wires E1–E3 and A1–A3, respectively, serve as inputs and outputs of the matrix control lead network. These leads correspond to one input or one output of the switching multiple.

Ground can be applied, as a marking potential, to each of these inputs of the control lead network via the contact *e* of a relay E, not shown on the drawing. This marking indicates that the corresponding input of the switching multiple may be connected with an available output. If the outputs of the control lead network are in the idle condition, they bear a potential of —20 volts which are applied via individual resistors, as for example resistor R1 which indicates the output A1. These resistors have very high-ohmic value as compared with the resistances of the windings of the crosspoint elements.

If ground is applied to the input wire E1 by closing relay contact *e*, the diodes Dc, D*k*1, D*k*2, D*k*3 are made conductive. Consequently, circuits are formed from the ground potential and the wire E1 through the diode Dc, the contact *c*1 of the seizing relay C1, the series-connection of one of the rectifiers D*k*1–D*k*3 with one of the excitation windings I of the crosspoint elements KP1–KP3, the output wires A1–A3, and their individually associated resistors (of which only R1 is shown) to the negative potential of —20 volts. Since these resistors have a high-ohmic value, as compared to the resistance of the excitation windings I, only marginal current flows through the excitation windings KP1 I, KP2 I and KP3 I. Therefore, approximately a ground potential appears at point P1 of the wire A1, as well as at the corresponding points of the wires A2 and A3. This ground potential marks those outputs that can be reached by the input that has been marked.

A quickly operating, selecting circuit now seizes one of the marked outputs, e.g., the output A1. At this seizing, the selecting circuit closes contact *a* and the wire A1 is connected to a source of —30 volts. An alternative circuit would bridge the resistor R1 by the contact *a*. A sufficiently strong current now flows through the excitation winding KP1 I of the crosspoint element, located between the marked input and the seized output, to cause an operational response of the crosspoint element.

The connecting path is through-connected. Thereupon contact *b* is closed and contact *a* is opened again by a device not shown on the drawing. A positive voltage of 30 volts is applied to the wire A1 via contact *b*. This positive voltage back biases the diodes D*k*1 and Dc and forwardly biases the Dz. The bridging of the seizing relay C1 through diode Dc is thus eliminated and said relay operates. Contact *c*1 opens and disconnects the marking potential from the excitation windings I connected with the wire A1. Having operated, the crosspoint element KP1 has closed its contact *kp*1 to complete the following holding circuit: +30 volts, contact *b*, wire A1, holding winding KP1 II, contact *kp*1, diode Dz, relay C1, wire E1, contact *e*, ground. The connection is held over this circuit as long as both potentials remain applied to the wires E1 and A1.

During the potential inversion at the wire A1, a release of the through-connected path is safely prevented because the dropping delay time of the crosspoint element KP1 is increased. During this switchover period the excitation winding KP1 I and the holding winding KP1 II are series-connected in a short-circuit traced from the contact *kp*1, the diode Dz, the contact *c*1, and the rectifier D*k*1 to the contacts KP1. Despite the separate functions of both windings, the whole winding capacity is fully effective as a short-circuit for the dropping delay of the crosspoint element. Thereby the advantage of an increased time constant is obtained, compared to a short-circuit arrangement of the excitation winding alone. Assuming that the inductivity L of a winding $L=kW^2$, whereby W is the number occurrence and $k$ the characteristic magnitude equal for all windings, the time constant $T_I$ in case of the short-circuit of the excitation winding I alone is $$T_I=\frac{k}{R_I}\cdot W_I^2$$

(R thereby is the ohmic resistance of the winding). The time constant $T_{(I+II)}$ in case of a short-circuit across both windings I and II of a crosspoint element however is:

$$T_{(I+II)}=\frac{k(W_I+W_{II})^2}{R_I+R_{II}}$$

For $R_I=R_{II}=R$ the equation renders a maximum of T for $W_I=W_{II}=W$:

$$T_{max}=\frac{2kW^2}{R}$$

and therefore applies $T_{max}=2T_I$.

As this short-circuit exists only at the output during the potential inversion when contacts *b* close and *a* open following the through-connection, the release of this crosspoint element is not delayed when the connection is released.

FIG. 2 shows the various circuits passing through the windings of a crosspoint element. The potentials applied to the output wire A are shown as being applied via a switch S*ch*. This switch has four positions corresponding to the different phases of the establishment of a connection.

Negative potential is applied to the output via the high-ohmic resistor R in the position O. A marginal current flows through the excitation winding I at this time.

In switch position 1, after the output has been seized, the output is directly connected to a higher negative potential. The excitation winding I receives a sufficiently strong current to cause the crosspoint element to respond and operate.

In switch position 2, during the potential inversion at the output, both windings I and II are inserted in a short-circuit (contact *kp* is closed).

In switch position 3, after the potential inversion at the output is completed, holding current flows through the holding winding II.

Figure 3:
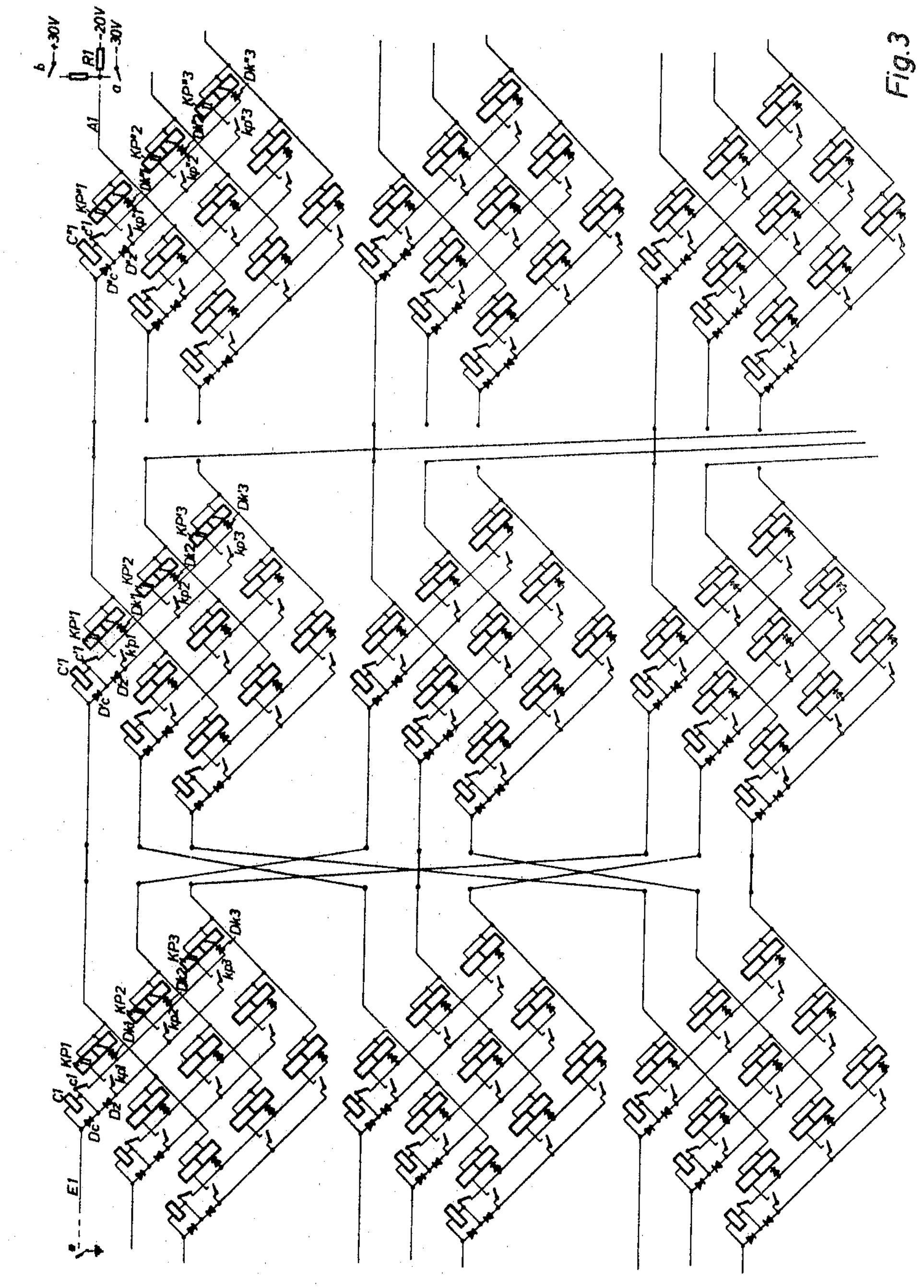
FIG. 3 shows an extension of the circuit arrangement according to FIG. 1 to a three-stage crosspoint arrangement.

FIG. 3 shows the control lead network for a three-stage crosspoint arrangement. The mode of operation for the circuit arrangement of FIG. 3 is the same as the mode described for FIG. 1. However, it should be mentioned that, in the respective marginal current circuits, responding circuits and holding circuits the excitation windings and holding windings respectively of the crosspoint elements belonging to a connecting path are series-connected.

Figure 4:
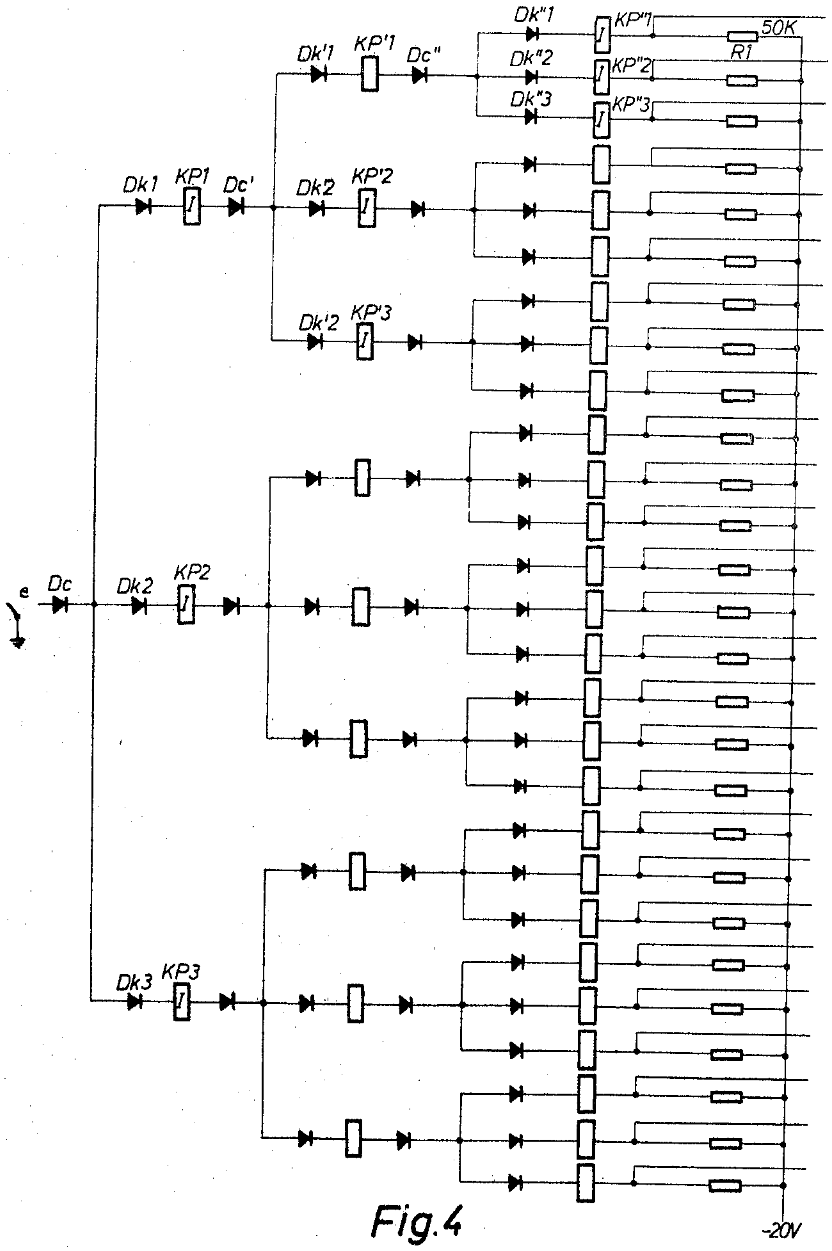
FIG. 4 shows a schematical representation of a part of the circuit arrangement shown in FIG. 3.

FIG. 4 schematically shows the marginal current and responding circuits which are possible in the circuit arrangement according to FIG. 3 when applying marking potential (ground) to the wire E1.

The reference numerals are identical in all figures as far as they refer to the same elements. Therefore, the relationship between FIGS. 3 and 4 needs no further explanation.

In the preferred embodiment of the invention, the wire A1 receives a higher negative potential (—30 volts) after the output has been seized and the resistor R is not simply short-circuited by a closure of the contacts *a*. The potential applied to the resistor R1 in the non-operative condition should not be too high. The number of marginal current circuits, formed when an input is marked, depends upon the instantaneous line conditions. A response of the crosspoint element must be safely provented, even if only a few marginal current circuits are formed and consequently a lower branching of currents occurs. However, after contact *a* has closed, a reliable response by several series-connected crosspoint elements should be obtained by the use of a higher operating potential.

The circuit arrangements, shown in FIGS. 1 and 3, can be modified in a simple manner so that inputs and outputs can be interchanged arbitrarily. This interchange enables the establishment of a connection in both directions to obtain the advantages of a folded network. The only change necessary is to provide the circuit arrangements shown in FIGS. 1 and 3, with input circuits comparable to the disclosed output circuits, wherein the inputs of the control lead network are connected to —20 volts via high-ohmic individual resistors.

The establishment of a connection from one input to an output is initiated by a closing of the respective contact *e* (applying of ground as marking potential) and is performed entirely as described.

When establishing a connection from an output to an input, only the functions of contacts *e* and *a* are exchanged. To mark an output, the respective contact *a* is closed (applying of —30 volts as marking potential), and marginal current circuits are formed. A selecting device selects an input by closing the contact *e*, associated to the input. The corresponding circuit for the crosspoint elements of a connecting path is formed. After the path is through-connected the potential and the output is inverted by closing of contact *b* and opening of contact *a*.

What is claimed is:

1. A control circuit for a glass reed crosspoint arrangement in which one connecting path is possible between any particular input and output, comprising means including a single-wire control lead passing through the crosspoint arrangement in parallel with the speech wires for controlling said crosspoint, marginal current circuit means for applying an end-marking to said crosspoint arrangement for finding the outputs reachable from a particular input via the crosspoint elements, means for through-connecting a route leading from said particular input to one of these outputs, means for activating a circuit formed via the crosspoint elements belonging to said route, and holding circuit means formed via said crosspoint elements to hold the through-connected route.

2. The control circuit according to claim 1 wherein said outputs may be either busy or idle, and means for applying a potential of a defined polarity to all idle outputs of the control lead network to form said marginal current circuits, said potential having a value such that said marking potential causes only a low level of current to flow through the control leads and crosspoint elements associated with the connecting routes starting from said input.

3. The control circuit according to claim 1 and means responsive to said marginal current for through-connecting a path to a selected output of the control lead network, and means for thereafter applying a potential to said leads to cause a heavier current to flow through the control leads and crosspoint elements in the through connected path between said selected output and the marked input.

4. The control circuit according to claim 1 and means operative after a path has been through-connected for applying a potential of opposite polarity to the corresponding output of the control lead network in order to form a holding circuit for the crosspoint elements concerned.

5. The control circuit according to claim 1 wherein said marginal current means comprises circuit including a diode at each crosspoint of two control leads for connecting a marking path in series with an excitation winding of the corresponding crosspoint element, means for connecting the output of an idle marked control lead via an individual resistor having a high-ohmic value as compared to the resistance of the excitation windings of the crosspoint elements with a potential source of said defined polarity, the diodes being inserted between these outputs and an input to which said marking potential is applied and being poled to conduct said marking potential.

6. The control circuit according to claim 5 and contact means closed after selection of an output for connecting said output directly with a potential source of the said defined polarity.

7. The control circuit according to claim 5 wherein the potential directly applied to the corresponding output after through-connection of a path has been completed is higher than the potential of the same defined polarity applied to the output in the idle condition via said high-ohmic resistor.

8. The control circuit according to claim 5 and circuit means for connecting a holding winding of the crosspoint element in a parallel circuit with the series-circuit formed by a diode and the excitation winding of the same crosspoint element, said parallel circuit being connected through a make-contact of said crosspoint and a second diode which is poled oppositely to the first diode, and means for connecting a potential source of opposite polarity with an output of the control lead network after a path has been through-connected.

9. The control circuit according to claim 5 and means associated with each control lead corresponding to an input of a switching multiple of the crosspoint arrangement for energizing the winding of a seizing relay in the holding circuit formed after the path has been through-connected, means responsive to operation of said relay for disconnecting all excitation windings connected to said control lead.

10. The control circuit according to claim 8, and means responsive to a switching of an output from one potential source of one polarity to a potential source of the other polarity for energizing both the excitation winding and the holding winding of each crosspoint element associated with the path to be through-connected, means for short-circuiting said windings in a closed circuit via a make-contact of said crosspoint, the first diode, the second diode, and a break-contact of a seizing relay.

11. The control circuit according to claim 5 and idle marking means for also connecting the inputs with the defined polarity potential source, via individual resistors having a high-ohmic value as compared with the resistance of the excitation windings of a crosspoint element

References Cited

UNITED STATES PATENTS

| | | | |
|---|---|---|---|
| 3,324,249 | 6/1967 | Cotroneo et al. | |
| 3,347,995 | 10/1967 | Schulter et al. | 179—18 |
| 3,387,094 | 6/1968 | Siegel et al. | |

DONALD J. YUSKO, Primary Examiner

U.S. Cl. X.R.

179—18